No. 809,109. PATENTED JAN. 2, 1906.
J. W. HAYNIE.
COTTON CHOPPER.
APPLICATION FILED MAR. 7, 1905.
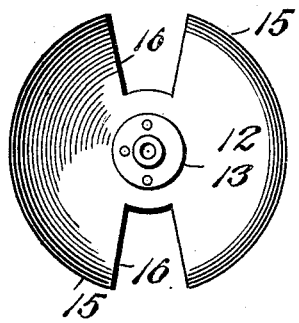
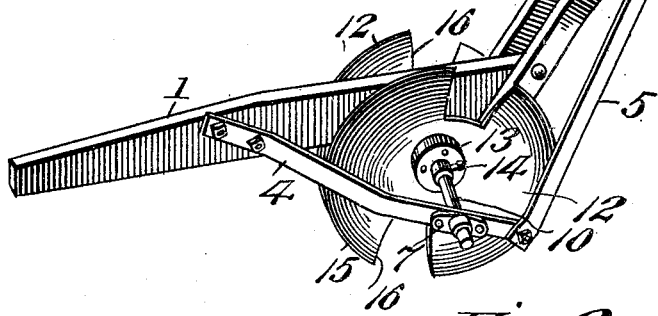
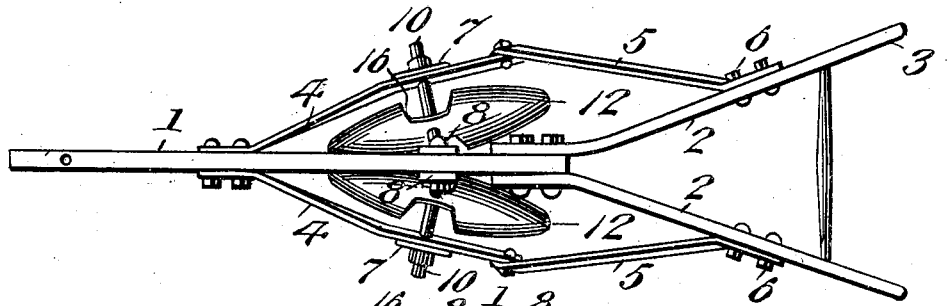
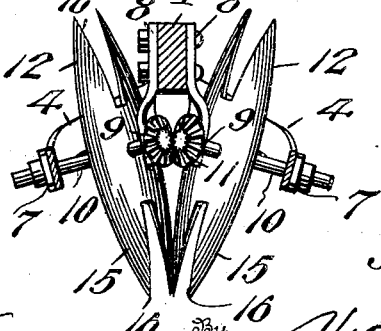
Witnesses
Geo. Ackman Jr.
Katharine Allen
Inventor
J. W. Haynie,
By Victor J. Evans
Attorney

UNITED STATES PATENT OFFICE.

JAMES W. HAYNIE, OF FAIRBURN, GEORGIA.

COTTON-CHOPPER.

No. 809,109.　　　　Specification of Letters Patent.　　　Patented Jan. 2, 1906.

Application filed March 7, 1905. Serial No. 248,900.

*To all whom it may concern:*

Be it known that I, JAMES W. HAYNIE, a citizen of the United States, residing at Fairburn, in the county of Campbell and State of Georgia, have invented new and useful Improvements in Cotton-Choppers, of which the following is a specification.

The invention relates to an improved cotton-chopper particularly constructed and arranged for the effective thinning out of standing cotton-stalks.

The invention consists mainly in a cotton-chopper comprising a pair of coöperating cutting-disks having interrupted or recessed cutting edges and a suitable framework for properly bracing and supporting said disks during operation.

The invention in its preferred embodiment of details will be described in the following specification, reference being had to the accompanying drawings, in which—

Figure 1 is a perspective view of a cotton-chopper constructed in accordance with my invention. Fig. 2 is a plan of the same. Fig. 3 is a transverse section of the chopper. Fig. 4 is a view in elevation of one of the cutting-disks.

Referring particularly to the drawings, my improved cotton-chopper comprises a draft-beam 1, to the rear end of which is secured the usual divergent handle-bars 2, having the ordinary hand-grips 3 at their free ends.

To provide a simple and efficient framework for directly supporting the cutting-disks, I secure brace-bars 4 to the beam 1, one on each side thereof, and extend said bars rearward and downward and preferably divergent from their point of connection with the beam. The rear end of each brace-bar is connected with the lower end of a supporting-bar 5, which bars extend upwardly toward and are directly connected to the handles 2, preferably by a removable connection 6, arranged to permit adjustment when desired. Forward of its connection with the supporting-bar each brace-bar is provided with a journal or bearing 7, the bearings of the respective brace-bars being arranged in alinement transverse to the length of the draft-beam, whereby to properly position the shafts supported by said bearings.

8 represents hanger-straps, one on each side of the draft-beam and secured thereto at the upper ends. The hanger-straps are secured to the beam slightly in rear of a line joining the bearings 7 and are less in length than the vertical distance between the beam and bearings 7. The lower ends of the straps 8 are provided with bearings 9 of any suitable character. Shafts 10 are mounted in the respective pairs of bearings 7 and 9, one shaft extending each side of beam 1. By reason of the respective lengths and positions of brace-bars 4 and hanger-straps 8 shafts 10 incline downward and forward from the brace-beam. The inner or meeting ends of shafts 10 are respectively provided with a bevel-gear 11, arranged to intermesh and serving to secure uniformity and regularity in the revolution of the cutting-disks.

Cutter-disks 12 are supported by the framework described, one on each shaft 10. The disks are preferably of thin metal and dished, being provided with fixed bearing-collars 13, carrying set-screws 14, by which the disks may be adjustably secured on the shafts. The peripheries of the disks are sharpened to provide cutting edges 15, and this cutting edge is interrupted by forming radial recesses 16 in the disks, extending to the edge thereof, as shown. The disks 12 are secured on the shafts 10 so that the recesses of one disk register in transverse alinement with the recesses of the other disk. Owing to the inclination of the shafts 10, the disks 12, which are of course at right angles to said shafts, will also incline from the vertical, the disks being so adjusted lengthwise the shafts as to insure contact of the respective cutting edges 15 at the extreme lowest point of travel of said cutting edges, thereby providing and maintaining a shearing junction of the cutting edges at the point of the disks in contact with the ground.

The operation will be fully apparent from the foregoing, it being understood that as the chopper is drawn forward through the cotton-stalks the cutting edges will sever all stalks passing between the disks, and this cutting will continue until a registering pair of recesses 16 reaches the shearing junction of the disks, when the junction of the cutting edges will be interrupted, and the stalks during the interruption of the cutting action will be left standing.

The forward incline of the cutter-shafts is a material feature of the invention and tends to prevent undue strain on the cutting-disks during operation, for by reason of this incline the rear edges of the disks are at all times more separated than the front edges.

The frame for the disks, including the brace-bars 4, the supporting-bars 5, and the hanger-strap 8, provides a simple and efficient support for the disks and one in which any part may be readily and conveniently renewed without inconvenience or material loss of time.

Though I have shown but two recesses 16 in each cutting-disk, it is to be understood that they may be in any number or size desired and also that the disks proper may be of any suitable size or material.

Various changes of construction and arrangement of the above details may be made without departing from the spirit of my invention, and I consider all such as within the scope thereof.

Having thus described the invention, what is claimed as new is—

1. A cotton-chopper, comprising a draft-beam and handle-bars connected thereto, a removable framework comprising brace-bars connected to the beam, supporting-bars connected to the handle-bars and to the ends of the brace-bars, and hanger-straps depending from the beam, shafts supported in the hanger-straps and brace-bars, said shafts inclining downwardly and forwardly from the beam, and a cutting-disk fixed on each of said shafts.

2. A cotton-chopper comprising a draft-beam and handle-bars connected thereto, brace-bars connected to the beam and extending downwardly and rearwardly therefrom, supporting-bars adjustably connected to the handle-bars and to the brace-bars, shafts supported at their outer ends in said brace-bars, a cutting-disk fixed on each of said shafts, and means depending from the beam to support the inner ends of said shafts.

In testimony whereof I affix my signature in presence of two witnesses.

JAMES W. HAYNIE.

Witnesses:
C. R. HARVEY,
G. J. HEARN.